United States Patent
Kim et al.

(10) Patent No.: US 9,525,464 B2
(45) Date of Patent: Dec. 20, 2016

(54) WIRELESS POWER SUPPLY DEVICE, ELECTRONIC DEVICE CAPABLE OF RECEIVING WIRELESS POWER, AND METHOD FOR CONTROLLING TRANSMISSION OF WIRELESS POWER

(75) Inventors: Jaehong Kim, Seoul (KR); Haesoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 641 days.

(21) Appl. No.: 13/993,481

(22) PCT Filed: Dec. 16, 2010

(86) PCT No.: PCT/KR2010/009023
§ 371 (c)(1),
(2), (4) Date: Jun. 12, 2013

(87) PCT Pub. No.: WO2012/081749
PCT Pub. Date: Jun. 21, 2012

(65) Prior Publication Data
US 2013/0264880 A1    Oct. 10, 2013

(51) Int. Cl.
*H01F 27/42* (2006.01)
*H04B 5/00* (2006.01)
(Continued)

(52) U.S. Cl.
CPC .............. *H04B 5/0037* (2013.01); *H02J 5/005* (2013.01); *H02J 7/025* (2013.01); *H02J 9/00* (2013.01);
(Continued)

(58) Field of Classification Search
CPC ........ H02J 5/005; H02J 9/005; H02J 13/0006; H02J 2003/143; H02J 7/025; Y10T 307/625; Y02B 70/3216; Y02B 60/50; H04B 5/0037; Y04S 20/221
(Continued)

(56) References Cited

U.S. PATENT DOCUMENTS

| 4,677,311 | A | * | 6/1987 | Morita | ...................... G06F 1/30 |
| | | | | | 307/64 |
| 2009/0156268 | A1 | | 6/2009 | Kim et al. | |

(Continued)

FOREIGN PATENT DOCUMENTS

| KR | 10-2005-0066392 A | 6/2005 | |
| KR | 10-2009-0062224 A | 6/2009 | |
| KR | 0093531 | * 3/2010 | ............ G06Q 60/06 |

*Primary Examiner* — Jared Fureman
*Assistant Examiner* — Duc M Pham
(74) *Attorney, Agent, or Firm* — Birch, Stewart, Kolasch & Birch, LLP

(57) ABSTRACT

The present application relates to a wireless power supply device and wireless power transmission control in an electronic device capable of receiving wireless power. According to an embodiment of the present application, the electronic device capable of receiving wireless power comprises a communication unit which receives power information including at least one piece of electricity bill information and power demand information. Also, the electronic device comprises a wireless power receiving unit which receives wireless power wirelessly supplied from a wireless power supply device, and a power converting unit which converts the wireless power received into power that can be used in the electronic device. By using various embodiments suggested by the present application, use of power wirelessly supplied can be efficiently controlled, and accordingly, electric power can be economically and efficiently used.

12 Claims, 13 Drawing Sheets

(51) Int. Cl.
   *H02J 5/00*      (2016.01)
   *H02J 7/02*      (2016.01)
   *H02J 9/00*      (2006.01)
   *H02J 13/00*     (2006.01)
   *H02J 3/14*      (2006.01)

(52) U.S. Cl.
   CPC ............ H02J 9/005 (2013.01); H02J 13/0006 (2013.01); *H02J 2003/143* (2013.01); *H02J 2003/146* (2013.01); *Y02B 60/50* (2013.01); *Y02B 70/3216* (2013.01); *Y02B 70/3233* (2013.01); *Y02B 70/3266* (2013.01); *Y04S 20/221* (2013.01); *Y04S 20/224* (2013.01); *Y04S 20/225* (2013.01); *Y04S 20/242* (2013.01); *Y10T 307/625* (2015.04)

(58) Field of Classification Search
   USPC ........................................................ 307/104
   See application file for complete search history.

(56) References Cited

U.S. PATENT DOCUMENTS

| | | | |
|---|---|---|---|
| 2009/0322280 A1* | 12/2009 | Kamijo | H02J 9/005 320/108 |
| 2010/0138363 A1 | 6/2010 | Batterberry et al. | |
| 2010/0201513 A1 | 8/2010 | Vorenkamp et al. | |
| 2010/0213895 A1 | 8/2010 | Keating et al. | |
| 2010/0253281 A1 | 10/2010 | Li | |
| 2010/0262313 A1 | 10/2010 | Chambers et al. | |
| 2011/0071696 A1* | 3/2011 | Burt | G06Q 50/06 700/295 |
| 2012/0209444 A1* | 8/2012 | Seo | A47L 15/0047 700/295 |

\* cited by examiner

WIRELESS POWER SUPPLY DEVICE, ELECTRONIC DEVICE CAPABLE OF RECEIVING WIRELESS POWER, AND METHOD FOR CONTROLLING TRANSMISSION OF WIRELESS POWER

TECHNICAL FIELD

The present disclosure relates to a wireless power supply device, an electronic device capable of receiving wireless power, and a method for controlling transmission of wireless power.

BACKGROUND ART

A new power grid in which the conventional analog power grid collaborates with the digital technology has been discussed. A method of receiving and transmitting power information live through bidirectional communication by the new digital power grid that collaborates with information technology has been also discussed. An example of the power grids that have been developed is Smart Grid technology, so-called intelligent power grid. Hereinafter, "Smart Grid Power Information Network", "Smart Grid", or "Power Network" are examples of intelligent power grids that is capable of the bidirectional communication. For convenience of explanation, the intelligent power grid is referred to as "Smart grid power information network". The smart grid power information network can be realized by various methods such as internet grid, Power Line Communication (PLC), or an additional new standardized power information grid.

Also, since various mobile or stationary wireless power receiving electronic devices have been recently developed, a wireless power supply device and a method of supplying power wirelessly to the wireless electronic devices are frequently discussed. For example, Wireless Power Consortium that leads international standards for wireless power supplying technology is organized and the wireless power supply technology is frequently discussed.

As the Smart grid power information network is more frequently discussed, there is more demand for saving electricity used by the electronic devices. Especially, saving electricity by using power efficiently is discussed. But although the Smart grid power information network regularly appears, there are no solutions for saving power used by the wireless power supplying devices when wirelessly transmitting power. Thus, it is needed to develop a wireless power transmitting method of efficiently using power by using various power information in the Smart grid power information network.

Also, when supplemental power storage means such as a battery is included in an electronic device that is capable of the wireless power reception, an efficient wireless recharging-up controlling method by using the Smart Grid power information needs to be discussed.

DISCLOSURE OF INVENTION

Technical Problem

The present disclosure is to provide a method of controlling an efficient wireless power transmission by using power information and an electronic device capable of wireless power reception by the method and wireless power supplying device.

Also, the present disclosure is to provide a method of controlling an efficient wireless power recharging by using power information and an electronic device capable of wireless power recharging by the method.

It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

Technical Solution

According to an embodiment of the present disclosure, an electronic device capable of receiving wireless power includes a communication unit receiving power information including at least one of electricity bill information and power demand information, a wireless power receiving unit receiving wireless power from a wireless power supplying device, and a power converting unit converting the received wireless power to power usable for a corresponding electronic device. It further includes a controller determining a power saving period based on the received power information and controlling such that aborting wireless power transmission is requested to a wireless power supplying unit through the communication unit during the power saving period and wireless power transmission is requested to the wireless power supplying unit through the communication unit during a non-power saving period.

Also, the controller determines that the power saving period is a highpriced period from the electricity bill information or an overdemanding period from the power demand information.

A user is capable of setting the highpriced period or the overdemanding period.

The electronic device further includes a supplemental power unit supplying supplemental power. Power used in the supplemental power unit is utilized for minimum operation of the electronic device.

Also, the electronic device further includes a display unit providing a display screen. The controller controls such that a user notification message is provided to one side of the display unit based on whether it is during the power saving period.

The electronic device further includes a supplemental power storage storing supplemental power. The supplemental power of the supplemental power storage is used for main operation of the electronic device and is rechargeable.

The electronic device further includes a display unit providing a display screen. The controller controls such that a user notification message is provided to one side of the display unit based on whether it is during the power saving period and an amount of the supplemental power.

Also, if a user's wireless power transmission command or a user's wireless power transmission abortion command is inputted after the user notification message, the controller controls such that a wireless power transmission request or a wireless power transmission abortion request is transmitted to the wireless power supplying device through the communication unit.

The controller provides different notification messages for during the power saving period and sufficient supplemental power, during the power saving period and insufficient supplemental power, during a non-power saving period and sufficient supplemental power, and during the non-power saving period and insufficient supplemental power.

The electronic device further includes a supplemental power assuring unit in the supplemental power storage.

According to an embodiment of the present disclosure, a wireless power transmission control method for an electronic device receiving wireless power supplied from a wireless power supplying device includes steps of receiving power information including at least one of electricity bill information and power demand information, determining a power saving period from the received power information, requesting aborting wireless power transmission to the wireless power supplying device during the power saving period, and requesting wireless power transmission to the wireless power supplying device during a non-power saving period.

Also, the method further includes providing a notification message on one side of a display based on the determination of the power saving period.

The method further includes providing a notification message on one side of a display based on the determination of the power saving period and an amount of supplemental power rechargeable in the electronic device and executing one of a user's wireless power transmission request or a wireless power transmission abortion request based on the notification message.

According to an embodiment of the present disclosure, a wireless power supplying device includes a communication unit receiving power information including at least one of electricity bill information or power demand information, and a wireless power generator for supplying wireless power to an electronic device subject to supplying wireless power. It further includes a controller determining a power saving period from the received power information, transmitting information about requesting whether wireless power is continuously supplied during the power saving period, controlling the wireless power generator such that wireless power is supplied to the electronic device if a command to request wireless power transmission abortion is received, supplying wireless power to the electronic device during a non-power saving period, and controlling the wireless power generator such that wireless power transmission is aborted if a command to abort wireless power transmission is received.

The wireless power supplying device further comprising a power switching means, wherein the controller controls supplying external power to the wireless power generator by controlling the power switching means.

Also a wireless power transmission method of a wireless power supplying device supplying wireless power to an electronic device subject to supplying wireless power includes steps of receiving power information including at least one of electricity bill information or power demand information, determining a power saving period from the received power information, transmitting information about requesting whether wireless power is continuously transmitted to the electronic device during the power saving period and transmitting wireless power to the electronic device if a command to transmit wireless power is received from the electronic device, and supplying wireless power to the electronic device during a non-power saving period, and if a command to abort wireless power transmission is received from the electronic device, aborting wireless power transmission.

Advantageous Effects

Power usage is efficiently controlled when wireless power is supplied. Thus, power is efficiently and economically used through various embodiments of the present disclosure.

BEST MODE FOR CARRYING OUT THE INVENTION

Various embodiments according to the present disclosure will now be described. It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

Figure 1:
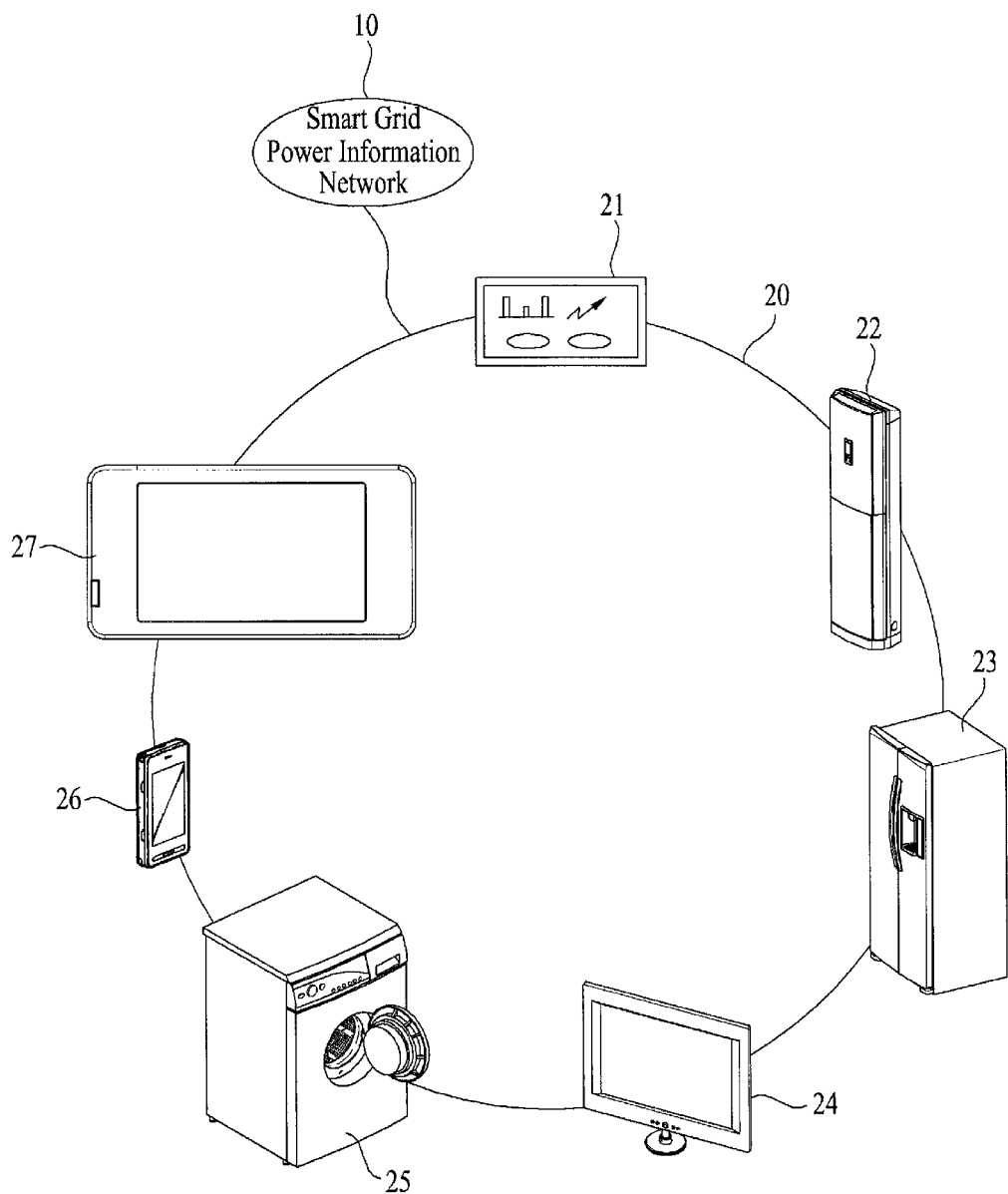
FIG. 1 illustrates a smart grid power information network to use power according to an embodiment of the present disclosure.

FIG. 1 illustrates a smart grid power information network to use power according to an embodiment of the present disclosure. Especially, FIG. 1 illustrates an embodiment of a specific intra network 20 connected in Smart Grid Power Information Network 10. The intra network 20 includes various electronic devices 21 to 27 such as an air conditioner 22, a refrigerator 23, a TV 24, a washing machine 25, a mobile devices 26, and wireless power supplying devices 27 that are connected to a communicable network and an additional smart server 21 controlling and managing the power usage of the electronic devices. The present disclosure relates to a method of transmitting wireless power between wireless power supplying devices 27 connected to the intra network 20 which is connected to the Smart Grid Power Information Network 10 and electronic devices capable of receiving wireless power.

Electronic devices capable of receiving the wireless power is not limited any subjects but can include all electronic devices that include a power receiving unit capable of receiving wireless power. In more detail, there are two types of electronic devices capable of receiving the wireless power. Firstly, one of the types is electronic devices such as the TV 24 or the smart server 21 shown in FIG. 1 that use only externally supplied wireless power as a main power without supplemental power storage means (i.e. batteries) which is used as independent power. But minimal supplemental power can be used to execute minimum functions such as user command reception or power on/off. This will be described shortly. Secondly, electronic devices such as the mobile devices 26 shown in FIG. 1 include additional supplemental power storage means (i.e. batteries) in the corresponding electronic device and are used as electronic devices that can use independent power by recharging.

Thus, the wireless power supplying device 27 is, hereinafter, referred to as "wireless power supplying device" and the electronic device capable of receiving the wireless power is referred to as an "electronic device" for convenience of explanation according to the present disclosure.

Figure 2:
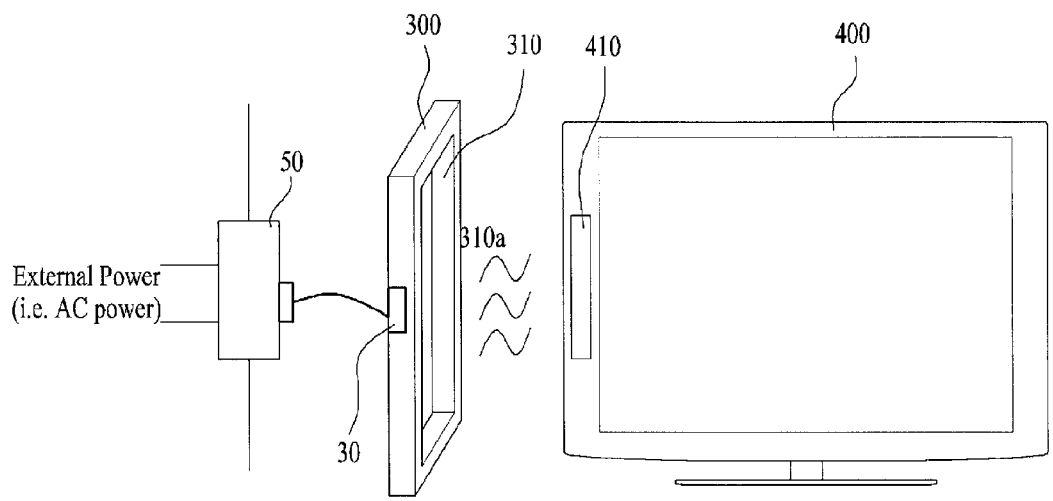
FIG. 2 illustrates a wireless power supplying device and an electronic device capable of receiving wireless power according to another embodiment of the present disclosure.

FIG. 2 illustrates a wireless power supplying device 300 and an electronic device 400 capable of receiving wireless power according to another embodiment of the present disclosure. FIG. 2 illustrates an embodiment of converting the supplied wireless power to inner power in the electronic device 400. The wireless power supplying device 300 by the embodiment in FIG. 2 includes at least a power connecting port 320 and a wireless power generator 310 to receive outer power 50. Thus, for example, wireless power 310*a* generated by the wireless power generator 320 (also called, "wireless power pad") is received in the wireless power receiving unit 410 in the corresponding electronic device 400 and it is converted to power that is usable in the corresponding electronic device 400. It is presumed that there is a shared technology standard between the wireless power supplying device 300 and the electronic device 400 that receives wireless power, in order to supply wireless power. For example, the most widely used technology standard is that electric energy in the wireless power supplying device 300 is converted to magnetic power and wirelessly supplied and the electronic device 400 that receives the magnetic power converts it back to electric energy. The present disclosure is not limited to specific wireless power supplying mechanisms.

Figure 3:
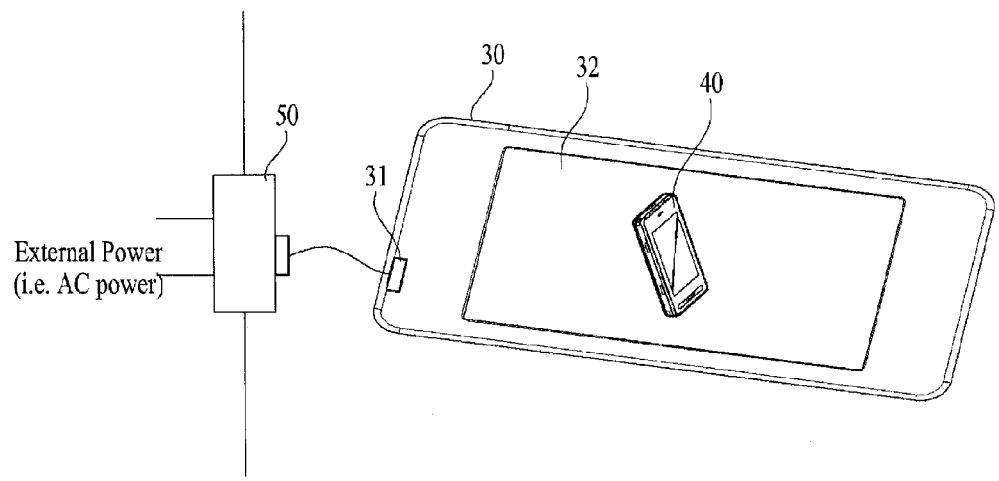
FIG. 3 illustrates a wireless power supplying device and an electronic device capable of receiving wireless power according to another embodiment of the present disclosure.

FIG. 3 illustrates the wireless power supplying device 30 and the electronic device 40 according to another embodiment of the present disclosure. Especially, FIG. 3. Illustrates an embodiment of recharging wireless power supplied from the electronic device 40 to an internal battery. The wireless power supplying device 30 by the embodiment of FIG. 3 includes at least a power connecting port 31 that can receive external power 50 and a wireless power generator 32 (also called, "recharging panel" or "recharging pad"). Thus, for example, wireless recharging can be executed by putting the electronic device 40 in need of wireless recharging on the recharging pad 32. There should be a shared technology standard for wireless recharging between the wireless power supplying device 30 receiving wireless power and the electronic device 40 that uses the wireless power. For example, the most widely used technology standard is that electric energy in the wireless power supplying device 30 is converted to magnetic power and wirelessly supplied and the electronic device 40 that receives the magnetic power converts it back to electric energy. The present disclosure is not limited to specific wireless power supplying mechanisms.

Figure 4:
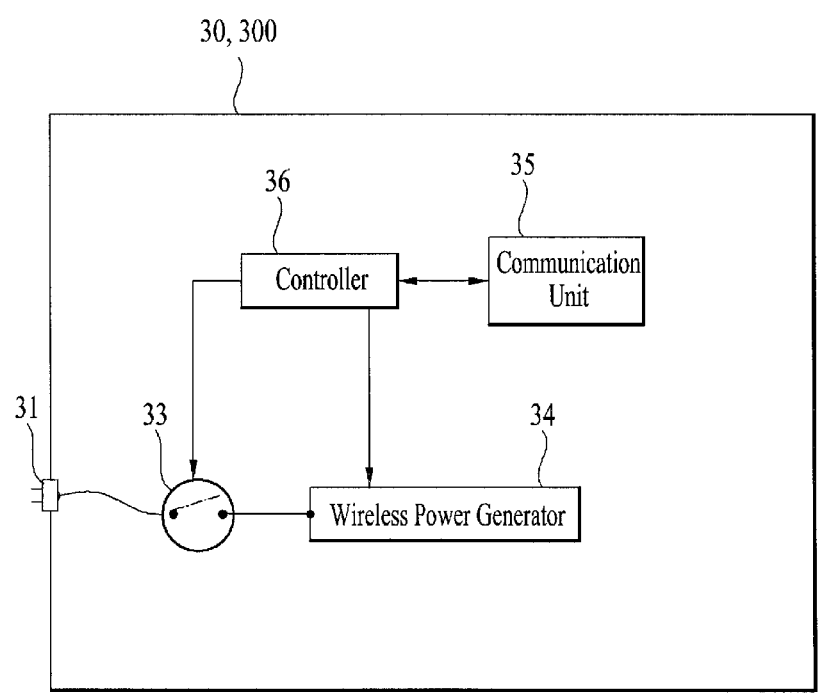
FIG. 4 illustrates a configuration of a wireless power supplying device according to the embodiment of the present disclosure.

FIG. 4 illustrates an internal configuration of a wireless power supplying device according to the embodiment of the present disclosure. The wireless power supplying device configuration in FIG. 4 is applicable for the wireless power supplying devices 30 and 300 according to the embodiments of FIG. 2 and FIG. 3. The wireless power supplying devices 30 and 300 can include a power connecting port 31, a power switching means 33, a wireless power generator 34, a communication unit 35, and a controller 36. However, the configuration is shown with functional blocks for convenience of explanation and for actual realization and the single configuration or a configuration with software programs are possible. In addition, it is obvious that some parts of the configuration are not necessary but supplemental according to some specific embodiment of the present disclosure. Although it is omitted in FIG. 4, the wireless power pad 320 shown in FIG. 2 or the recharging pad 32 shown in FIG. 3 can be equipped outside the wireless power supplying devices 30 and 300 by connecting to the wireless power generator 34.

The wireless poser generator 34 is composed of a circuit to supply wireless power and, for example, can be arranged considering circuit elements that convert electric energy to magnetic energy. But, detailed explanation of the circuit element arrangement is omitted because it is not relevant to the present disclosure.

Also, the communication unit 35 can receive power information through Smart Grid Power Information Network, or can be composed such that short distance wireless communication with the electronic device 40 is possible.

Also, the power switching means 33 can be composed such that external power connected through the power connecting port 31 according to the controller 36 is blocked from being supplied to the wireless power generator 34.

Figure 5:
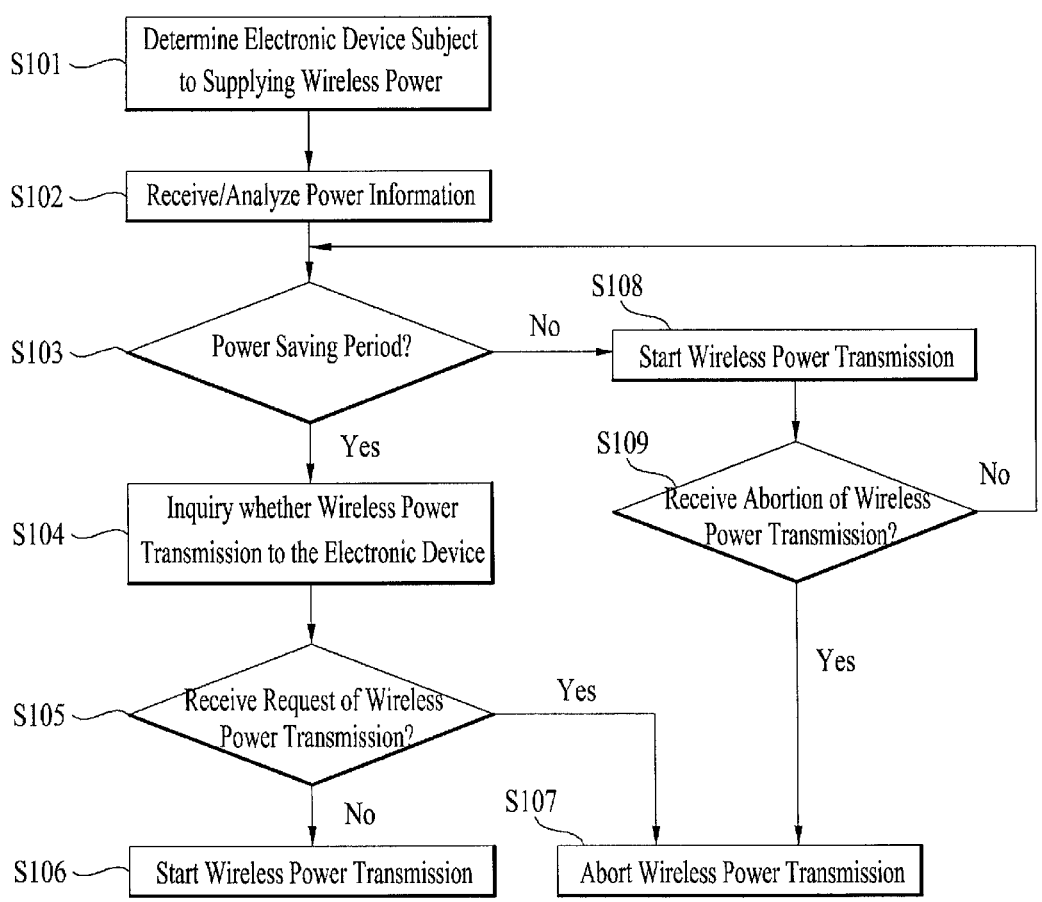
FIG. 5 is a flow chart of a method of controlling wireless power transmission in the wireless power supplying device according to the embodiment of the present disclosure.

The controller 36 controls the operation of the wireless power supplying device 30 and executes the control operation shown in the flow chart of FIG. 5. This will be now described in detail.

FIG. 5 is a flow chart of a method of controlling supplying wireless power in the wireless power supplying devices 30 and 300 according to the embodiment of the present disclosure. The controller 36 in the wireless power supplying device assures if there is an electronic device which is subject to wireless power supplied (S101). For example, it can be determined that there is the electronic device by receiving a wireless power supplying request signal from the electronic device 400 according to the embodiment in FIG. 2 or the electronic device 40 placed on the recharging pad 32. Also, it can be determined by short distance communication between the communication unit 35 in the wireless power supplying devices 30 and 300 and the communication unit 480 in FIGS. 6 and 48 in FIG. 10 in the electronic devices 40 and 400. The short distance communication between the communication units can be already-existing standards such as Zigbee or Bluetooth or potential standardized short distance communication technologies.

When the controller 36 recognizes an electronic device subject to supplied wireless power, it receives power information and/or analyzes the received power information (S102). Also, it determines whether the present time is within the power saving period based on the received power information in the step S102 (S103). For example, it is possible that determining whether the present time is within the power saving period is categorized as a highpriced period or an overdemanding period. The highpriced period or the overdemanding period can be set automatically or specified by the user. Also, the power saving period can be set based on the total amount of power consumption estimated by the used. The power saving period can be set by the smart server 21 in FIG. 1 which wholly or individually controls each electronic device 22 to 27 in FIG. 1 in the intra network 20.

The power information can be provided live or in specific time intervals on a regular basis. The type of the power information can be at least one of electricity bill information or power demand information or can include all of them based on the design.

In detail, the electricity bill information live or on a regular basis means information about changeable electricity charge and includes information about electricity charge in regular time units. Thus, when the electricity bill information is received, electricity charge at the present time can be checked or can be determined as a highpriced period or a low-priced interval according to the setting conditions. For example, a power providing company sets a higher charge at a highly demanded period (also called "peak time") so that consumers are inclined to save energy. Meanwhile, a lower charge at a lowly demanded period is set so that consumers are inclined to avoid the peak time and use electricity at the lowly demanded period.

Also, the electricity information live or on a regular basis means information about changing power demand and determined by analyzing prior record of power usage in each intra network through Smart Grid Power Information Network 10 or information about necessary amount of power provided by each intra network. Thus, when the power demand information is received, power demand at the present time can be checked and be determined as an over demand interval or a low demand interval according to the setting conditions. For example, electricity usage by the consumers can be reduced by setting a higher electricity charge at the over demand interval or rewarding incentives or recharging penalties regardless of the power charge.

If it is determined that it is within the power saving period in the step S103, the controller 36 notifies the corresponding electronic device of the power saving period and inquiry whether the wireless power is transmitted to the electronic device (S104). Also, the controller 36 assures whether wireless power transmission request information is received through the communication unit 35 (S105) based on the outcome of the inquiry in the step S104.

If the wireless power transmission request is continuously received from the corresponding electronic device even during the power saving period, the controller 36 starts to transmit wireless power transmission (S106). In other words, for example, the controller 36 can control such that wireless power is generated by controlling the power switching means 33 to be 'ON' state and supplying external power to the wireless power generator 34 through the power connecting port 31.

Meanwhile, if a wireless power transmission abortion request is received from the electronic device because it is within the power saving period, or it is detected that the corresponding electronic device is out of the range on the recharging pad 32 in FIG. 3 for a certain period of time (regarded as if the user refuses to wirelessly charge), the controller 36 aborts wireless power transmission (S107). In other words, for example, the controller 36 can control such that external power cannot be supplied to the wireless power generator 34 through the power connecting port 31 by controlling the power switching means 33 to be off. Also, if the controller 36 does not receive any response for a certain period of time despite the fact that the wireless power transmission has been requested in the step S104, it is possibly determined that the present time is not within the power saving period and the wireless power transmission can be forcefully aborted.

Also, if it is determined that it is not within the power saving period in the step S103, the controller 36 starts to transmit wireless power to the corresponding electronic device (S108). In other words, for example, the controller 36 can control for the step S108 that external power is supplied to the wireless power generator 34 to generate wireless power by controlling the power switching means 33 to be on.

But, even if the wireless power transmission is being processed, if a wireless power transmission abortion command is received (S109), or, for example, it is detected that the corresponding electronic device is out of range on the recharging pad 32 in FIG. 3 (regarded as if user refuses to wirelessly charge), the controller 36 aborts transmitting wireless power (S107). In other words, for example, the controller 36 can control such that external power is not supplied to the wireless power generator 34 through the power connecting port 31 by controlling the power switching means 33 to be on.

Figure 6:
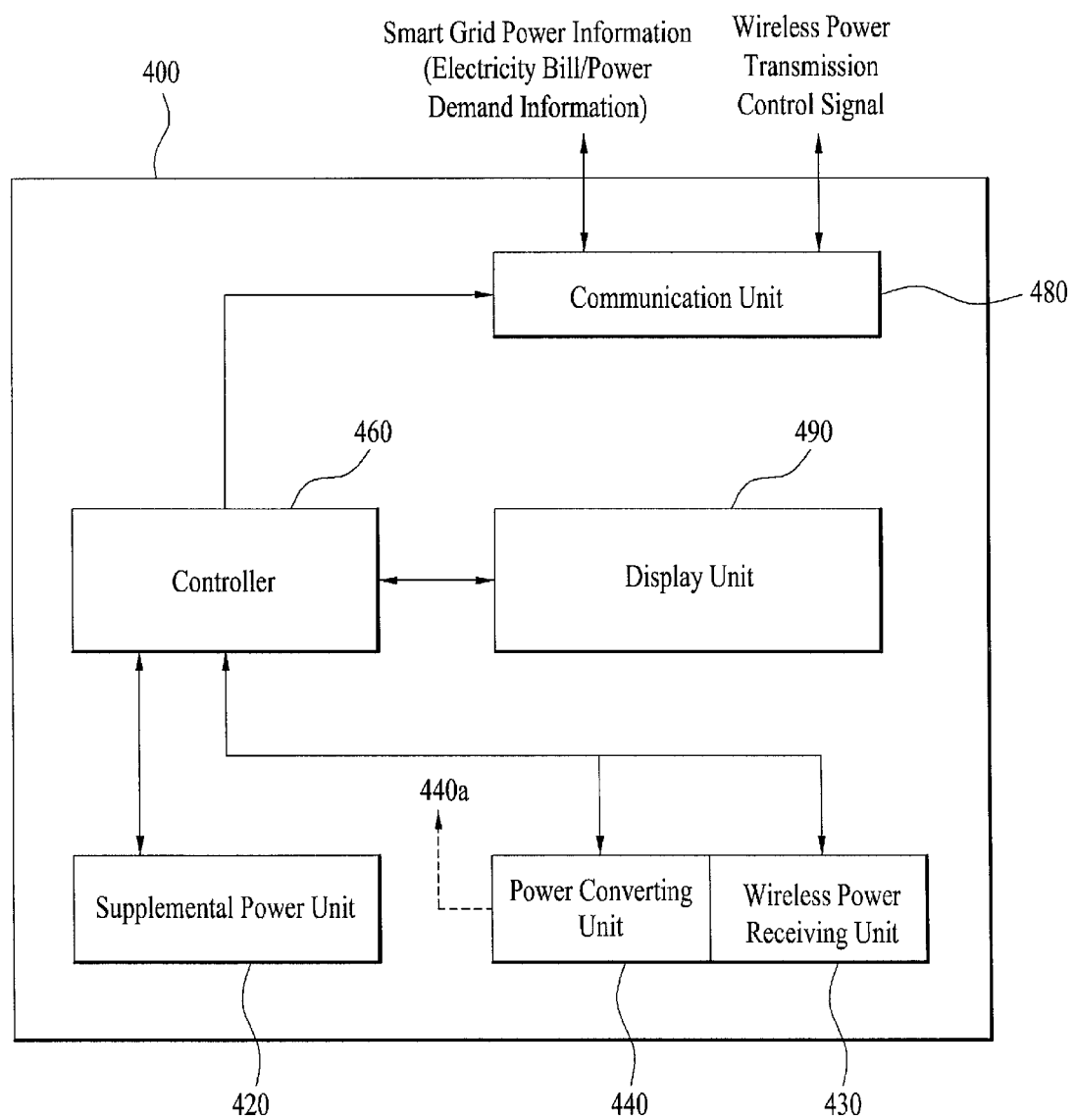
FIG. 6 illustrates a configuration of the wireless power supplying device shown in FIG. 2 according to the embodiment of the present disclosure.

FIG. 6 illustrates an internal configuration of the electronic device 400 capable of receiving wireless power according to the embodiment of the present disclosure. The electronic device 400 according to the embodiment in FIG. 6 uses wireless power provided by the wireless power supplying device 300. Thus, a method of receiving supplemental wired external power (i.e. AC power, system power) is excluded or can be mixed with the wireless power method. However, the external AC power is not illustrated in the present embodiment.

The electronic device 400 by the embodiment in FIG. 6 includes a supplemental power unit 420, a wireless power receiving unit 430, a power converting unit 440, the controller 460, a communication unit 480, and a display unit 490. However, the configuration is shown with functional blocks for convenience of explanation and for actual realization and the single configuration or a configuration with software programs are possible. In addition, it is obvious that some parts of the configuration are not necessary but supplemental according to some specific embodiment of the present disclosure.

The supplemental power unit 420 is a means to provide the least supplemental power that the corresponding electronic device 400 uses. For example, prior to supplying wireless power, a user's command to turn the power on is detected, the operation of the user's remote controller is received, or the least necessary power to execute the communication function with the wireless power supplying device 300 is stored. In other words, main power necessary for the actual operation of the corresponding electronic device (i.e. watching TV) is supplied by the wireless power supplying device 300. The supplemental power unit 420 can charge necessary power provided by the power converting unit 420 or be a small size battery that is removable and attachable.

The wireless power receiving unit 430 is designed by corresponding to the wireless power generator 34 in the wireless power supplying device 300 and includes a function of receiving wireless power that is supplied. Also, the power converting unit 440 converts wireless power received through the wireless power receiving unit 430 to usable power. Dotted lines with an arrow 440a in FIG. 6 mean usable power 440a that is provided by the power converting unit 440.

The communication unit 480 receives power information through Smart Grid Power Information Network 10 or the internal network 20 and communicates with the wireless power supplying device 300 by the short distance wireless communication method. But, according to an embodiment, the power information can be a power control command received from the external control devices (i.e. smart server 21 in FIG. 1). Also, the power information can be provided live or in regular time units on a regular basis. The type of the power information can be at least one of electricity bill information or power demand information or can include all of them based on the design. The detailed description of the electricity bill information or power demand information is the same as in FIG. 4. The communication unit 480 can receive information about self-generation connected to the internal network 20. The self-generation information is information about the amount of self-generation in the intra network, information about the usable amount of self-generation, and information of whether power being supplied to external devices is self-generation power.

Also, the controller 460 controls the operation of the electronic elements 420, 430, 440, and 480. The controller 460 determines the power saving period from the power information received by the communication unit 480 and controls such that the determined outcome is noticed by the user through the display unit 490. The determination of the power saving period by the controller 460 can be determined as the highpriced period or the overdemanding period. Also, the power saving period can be set by the user.

Also, the display unit 490 performs displaying a user notification message on the screen according to the controller 460 in addition to the traditional displaying functions of the corresponding electronic device.

Figure 7:
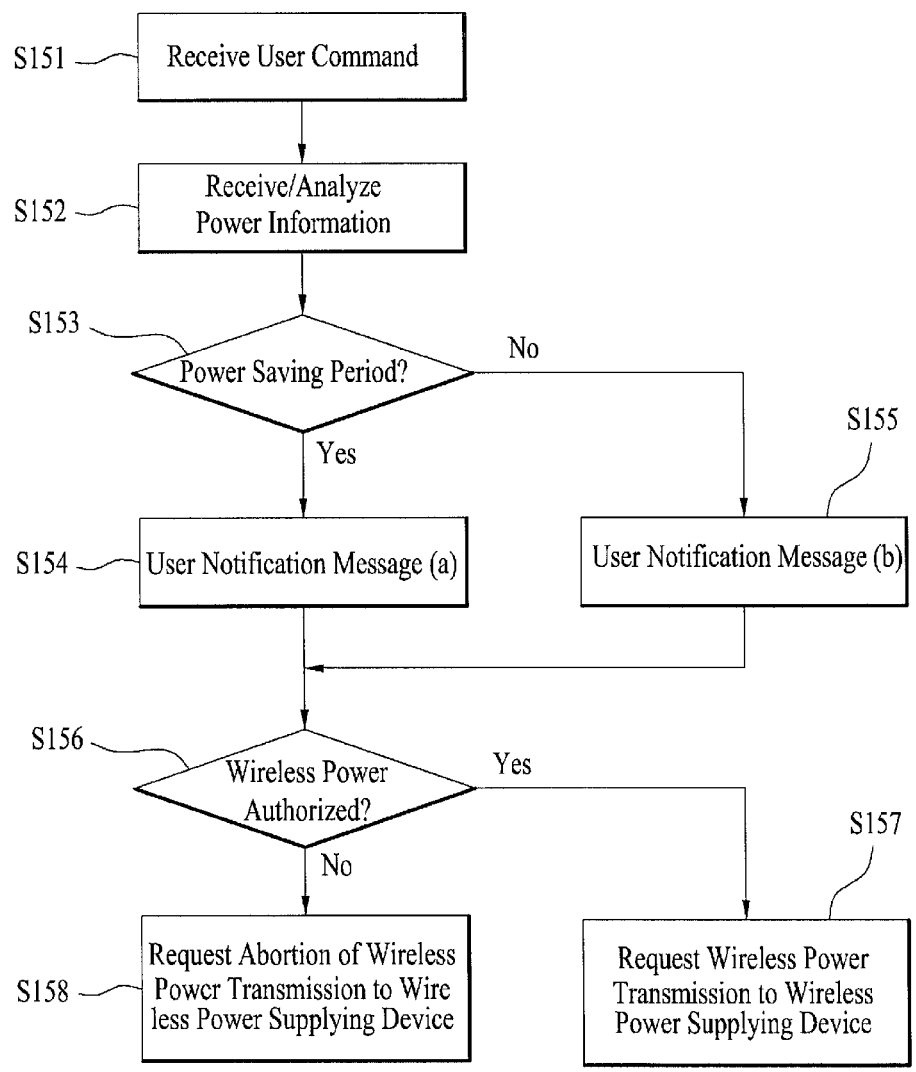
FIG. 7 is a flow chart of a method of controlling wireless power transmission in the electronic device shown in FIG. 6 according to the embodiment of the present disclosure.
Figure 8:
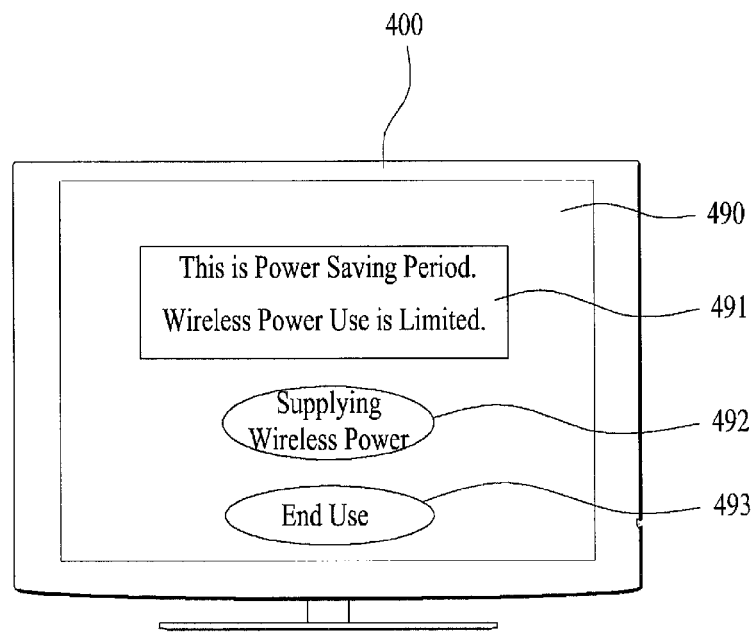
FIGS. 8 and 9 illustrate a user notification message according to the embodiment of the present disclosure.
Figure 9:
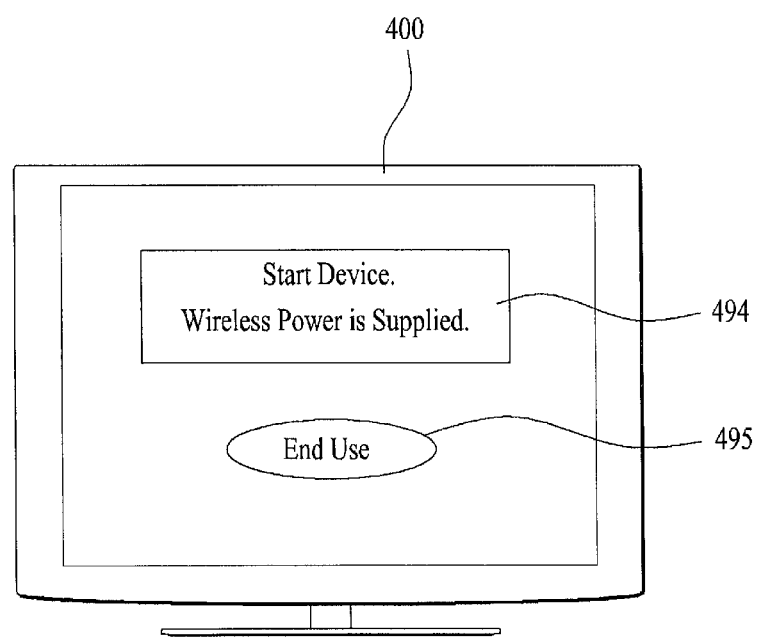

FIG. 7 is a flow chart of controlling wireless power supplied by the electronic device 400 capable of receiving the wireless power described in FIG. 6. FIGS. 8 and 9 illustrate embodiments of a user notification message according to an embodiment of the present disclosure. A control process in the wireless power supplying device in FIG. 5 and a control process in the electronic device in FIG. 7 may be an independent process respectively, or if at least one of the control process is operated, efficient operation of power usage corresponding to the power saving period is possible.

The controller 460 in the electronic device 400 receives a user's command (S151). For example, if it is detected that the user acts to turn the electronic device on, it can be detected as a user's command for the corresponding electronic device.

The controller 460 receives the user's command, the power information is received and/or received power information is analyzed (S152). Also, it is determined whether the present time is within the power saving period in the step S152 (S153). For example, it is possible that determining whether the present time is within the power saving period is categorized as a highpriced period or an overdemanding period.

If the present time is within the power saving period through the step S153, the controller 460 controls such that a user notification message (a) shown in FIG. 8 is provided on one side of the display unit 490. According to the embodiment of FIG. 8, the user notification message 491 notifies that wireless power is restricted because the present time is within the power saving period. But, if the user want to use the electronic device even during the power saving period, the electronic device is continuously used by clicking a "wireless power supplying" button 492. If the user does not want to use the electronic device, the electronic device use is aborted by clicking a "end use" button 493.

Thus, if the user clicks on the wireless power supplying button 492, the controller 460 determines that the wireless power use is authorized (S156) and it is request to transmit wireless power to the wireless power supplying device 300 (S157). Also, if the user clicks on the end use button 493 or does not respond for a certain period of time, the controller 460 determines that the wireless power use is not authorized (S156) and requests to abort the wireless power transmission to the wireless power supplying device 300. In the step S158, not supplying wireless power can be alternatively executed by not sending any signals to the wireless power supplying device.

If it is determined that the present time is not within the power saving period in the step S153, the controller 460 controls such that a user notification message (b) shown in FIG. 9 is provided on one side of the display unit 490. According to an embodiment in FIG. 9, the user notification message 494 notifies that since the present time is not within the power saving period, wireless power is supplied after the device is in use. But, if the user clicks on the "end use" button 495, the controller 460 determines that the user does not want to use the corresponding electronic device by wireless supplying (S156) and requests to abort the wireless power transmission to the wireless power supplying device 300 (S158). Meanwhile, after the notification message in FIG. 9, if there is no response for a certain period of time, the controller 460 determines that wireless power use is authorized (S156) and requests to transmit wireless power to the wireless power supplying device 300 (S157). It is obvious that the user notification messages 491 and 492 in FIGS. 8 and 9 can be realized in various modified embodiments.

Figure 10:
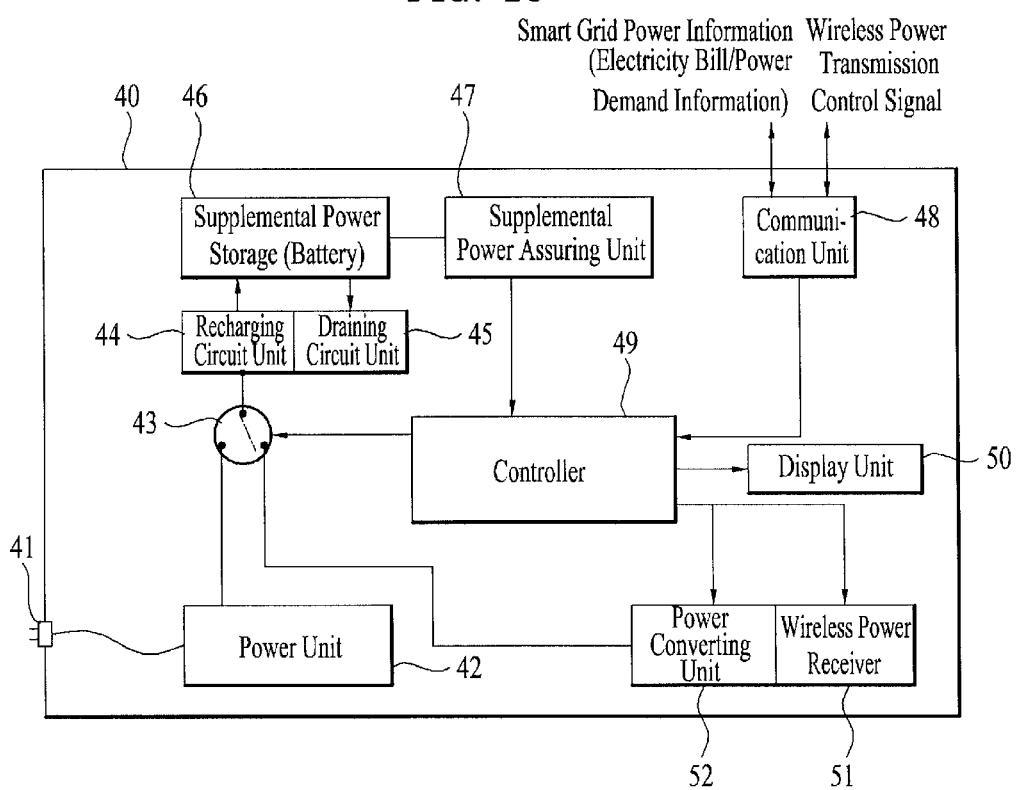
FIG. 10 illustrates a configuration of the electronic device shown in FIG. 3 according to another embodiment of the present disclosure.

FIG. 10 illustrates an internal configuration of the electronic device 40 capable of receiving wireless power according to another embodiment of the present disclosure. The embodiment in FIG. 10 shows that the electronic device 40 that receives wireless power can charge up wireless power in the internal supplemental power storage 46 (i.e. "batteries"). Hereinafter, it is referred to as "wireless recharging". The electronic device 40 according to the embodiment of FIG. 10 includes a power connecting port 41, a power unit 42, a supplemental power storage 46, a recharging circuit unit 44, draining circuit unit 45, supplemental power assuring unit 47, a communication unit 48, a controller 406, a display unit 50, a recharging switching means 43, a wireless power receiving unit 51, and a power converting unit 52. However, the configuration is shown with functional blocks for convenience of explanation and for actual realization and the single configuration or a configuration with software programs are possible. In addition, it is obvious that some parts of the configuration are not necessary but supplemental according to some specific embodiment of the present disclosure.

The power unit 42 is connected to the power connecting port 41 and supplies power to the device by receiving the system power (i.e. AC power) from the external power source. The external power source can be not only power provided by an outsource power company that sets electricity charge but also self-generated power created by self-generating sources (i.e. solar energy, wind energy). Also, the power unit 42 can be omitted according to the design. If the power unit 42 is omitted, the device is operated by receiving and recharging wireless power.

The supplemental power storage 46 charges and stores power through the recharging circuit unit 44 and supplies power to the device through the draining circuit unit 45. The supplemental power assuring unit 47 assures the amount of usable supplemental power in the supplemental power storage 46 and transmits it to the controller 49.

The communication unit 48 receives power information through Smart Grid Power Information Network 10 or the intra network 20, and communicates with the wireless power supplying device 30 by applying short distance wireless communication method. According to the embodiment, the power information can be a power control command transmitted from the external control device (i.e. smart server 21 in FIG. 1). The power information can be provided live or in regular time units on a regular basis. The power information can be electricity bill information and/or power demand information and its detailed description is as aforementioned.

The controller 49 determines the power saving period from the power information by the communication unit 48 and decides whether wireless recharging will be performed accordingly. The power saving period can be determined as the highpriced period or the overdemanding period. This can be determined by the user or the system.

Also, the recharging switching means 43 selects wired power or wireless power controlled by the controller 49 and stores it as supplemental power in the supplemental power storage through the recharging circuit unit 44.

Also, the display unit 50 displays the user notification message on the screen according to the wireless recharging control operation by the controller 49 in addition to its traditional display functions.

Also, the wireless power receiving unit 51 receives wireless power from the wireless power supplying device 30 but is designed in a way that it corresponds to the wireless power generator 33 in the wireless power supplying device 30. The power converting unit 51 converts the received wireless power to usable power in the device.

Figure 11:
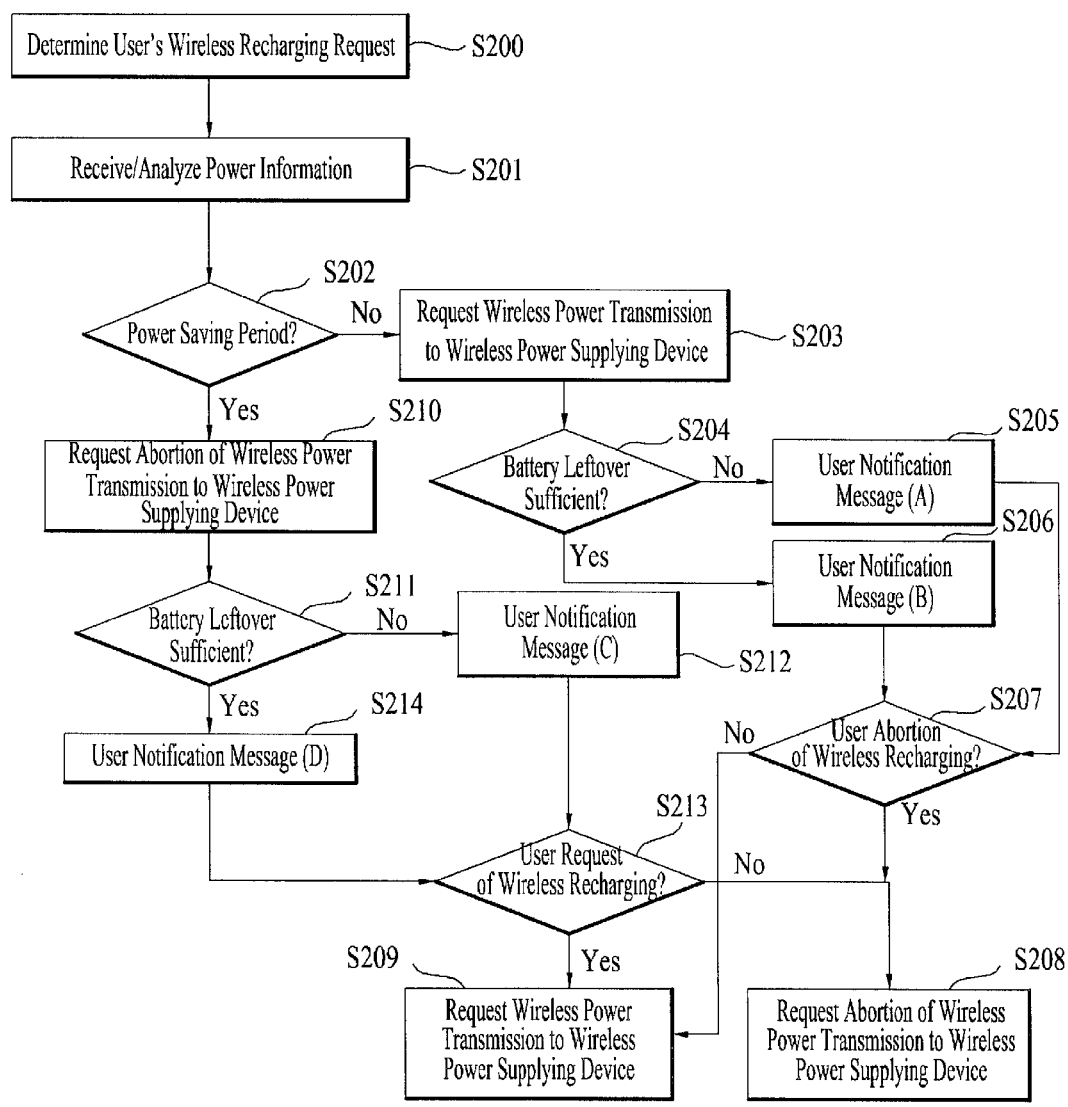
FIG. 11 is a flow chart of a method of controlling the wireless power transmission in the electronic device shown in FIG. 10 according to another embodiment of the present disclosure.

FIG. 11 is a flow chart of controlling wireless recharging in the electronic device 40 capable of receiving wireless power shown in FIG. 10 according to another embodiment. FIGS. 12 to 15 illustrate examples of the user notification message. A control process in the wireless power supplying device in FIG. 5 and a control processor in the electronic device in FIG. 11 are independent processors or if at least one of the control processors is operated, efficient operation of power usage corresponding to the power saving period is possible.

The controller 49 in the electronic device 40 assures if wireless recharging in the present corresponding electronic device has been requested by the user (S200). In the step S200, if the corresponding electronic device 40 is placed on the recharging pad 32 in FIG. 3, this indicates that the use has requested for wireless recharging. Another method is that the corresponding electronic device 40 can be assured as a device subject to wireless recharging by communications between the communication unit 48 in the electronic device 40 and the communication unit 35 in the wireless power supplying device 30.

If the controller 49 detects the user's request for wireless recharging, it receives or/and analyzes power information (S201). It is determined that the present time is within the power saving period through the step S201 (S202). For example, the power saving period can be determined as the highpriced period or overdemanding period.

If it is determined in the step S202 that the present time is not within the power saving period, the controller 49 transmits a command to request for wireless power transmission to the wireless power supplying device 30 (S203).

Subsequent to the step S203, the controller 49 assures the amount of supplemental power (hereinafter, called 'battery leftover') in the supplemental power storage 46 (hereinafter, called 'battery') by using the supplemental power assuring unit 47 (S204). However, the step S204 does not need to be performed after the step S203 and it is possible to frequently assure the battery leftover.

Figure 12:
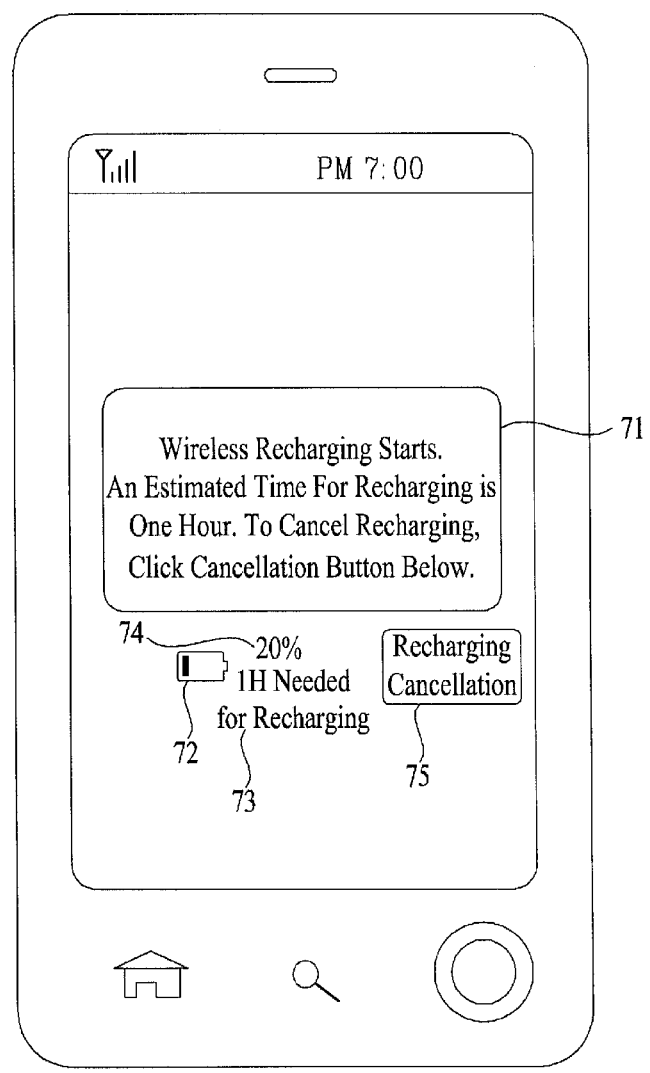
FIGS. 12 to 15 illustrate a user notification message according to another embodiment of the present disclosure.

If it is determined that there is not enough battery leftover in the step S204, the controller 49 provides the user notification message (A) as shown in FIG. 12 with the user (S205). Especially, it is possible to provide sound effects with the user notification message since the electronic device 40 can be out of the user's sight. According to the embodiment in FIG. 12, the user notification message (A) includes a text message 71 that inform the user of the current status, graphic messages 72, 73, and 74 that indicate the current status in graphics, and a recharging cancellation button 75. For example, the text message 71 informs the start of wireless recharging and an estimated time of recharging. Also, the current amount of battery leftover and the estimated time can be graphically provided by the graphic messages 72, 73, and 74. If the user cancels wireless recharging by referring to the text message 71 and the graphic messages 72, 73, and 74, the recharging cancellation button 75 can be selected (or clicked). If the controller 49 detects the user's wireless recharging cancellation request (S207), a command to cancel the wireless recharging is transmitted to the wireless power supplying device 30 and wireless recharging is aborted (S208). But, if there is no user's wireless recharging request, the controller 49 stays the wireless recharging and transmits the wireless power request command to the wireless power supplying device 30 on a regular basis, if necessary (S209).

Figure 13:
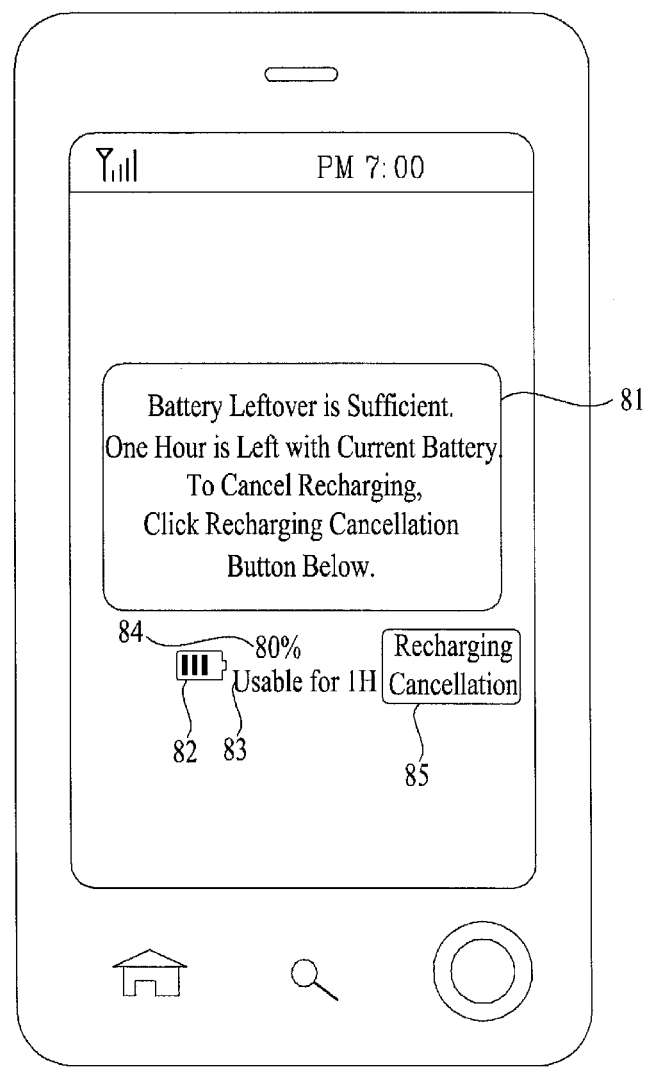

Also, if it is determined in the step S204 that there is sufficient battery leftover, the controller 49 provides the user notification message (B) shown in FIG. 13 with the user (S206). As mentioned, the user notification message can be provided with sound effects. According to an embodiment in FIG. 13, the user notification message (B) includes a text message 81 that inform the user of the current status, graphic messages 82, 83, and 84 that indicate the current status in graphics, and a recharging cancellation button 85. For example, the text message 81 informs the start of wireless recharging and an estimated time of recharging. Also, the current amount of battery leftover and the estimated time can be graphically provided by the graphic messages 82, 83, and 84. If the user cancels wireless recharging by referring to the text message 81 and the graphic messages 82, 83, and 84, the recharging cancellation button 85 can be selected (or clicked). If the controller 49 detects the user's wireless recharging cancellation request (S207), a command to cancel the wireless recharging is transmitted to the wireless power supplying device 30 and wireless recharging is aborted (S208).

Also, if it is determined in the step S202 that the present time is within the power saving period, the controller 49 transmits a command to request wireless power transmission abortion to the wireless power supplying device 30 (S210).

Subsequent to the step S210, the controller 49 assures battery leftover by using the supplemental power assuring unit 47 (S211). However, the step S211 does not need to be performed after the step S210 and it is possible to frequently assure the battery leftover.

Figure 14:
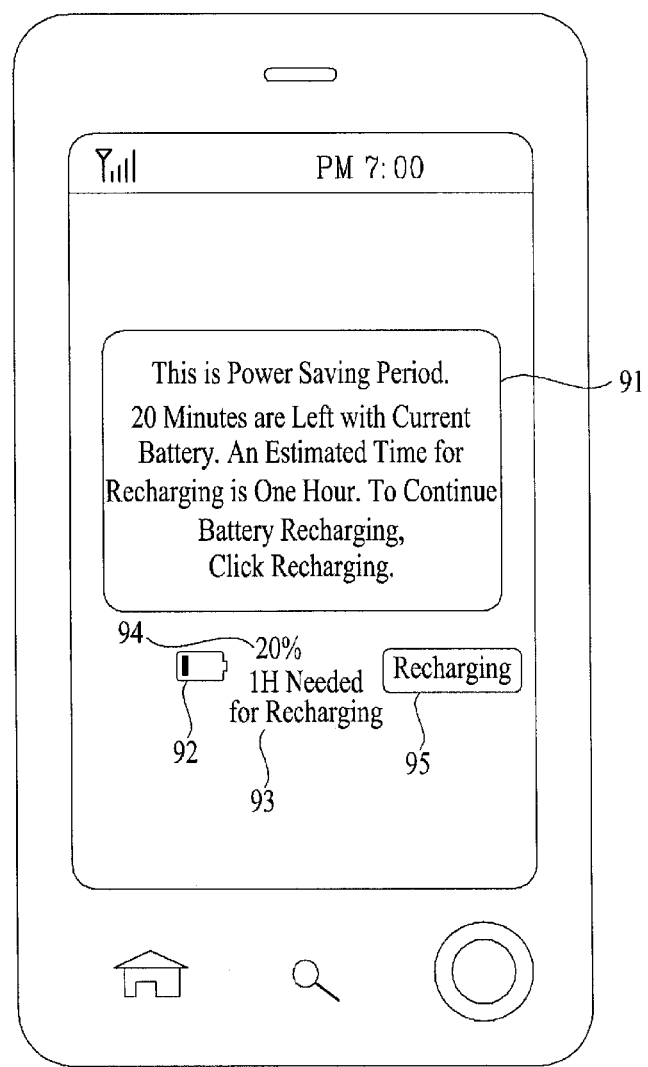

If it is determined that there is not enough battery leftover in the step S211, the controller 49 provides the user notification message (C) as shown in FIG. 14 with the user (S212). It is possible, as mentioned, to provide sound effects with the user notification message. According to the embodiment in FIG. 14, the user notification message (C) includes a text message 91 that inform the user of the current status, graphic messages 92, 93, and 94 that indicate the current status in graphics, and a recharging button 95. For example, the text message 91 informs the power saving period, battery leftover and an estimated time of recharging. Also, the current amount of battery leftover and the estimated time can be graphically provided by the graphic messages 92, 93, and 94. If the user executes wireless recharging by referring to the text message 91 and the graphic messages 92, 93, and 94, the recharging button 95 can be selected (or clicked). If the controller 49 detects the user's wireless recharging request (S213), a command to request the wireless recharging is transmitted to the wireless power supplying device 30 (S209) and then wireless recharging is enabled by the received wireless power. But, if there is no user's wireless recharging request, the controller 49 stays the wireless recharging being stopped and transmits the wireless power abortion request command to the wireless power supplying device 30 on a regular basis, if necessary (S209).

Figure 15:
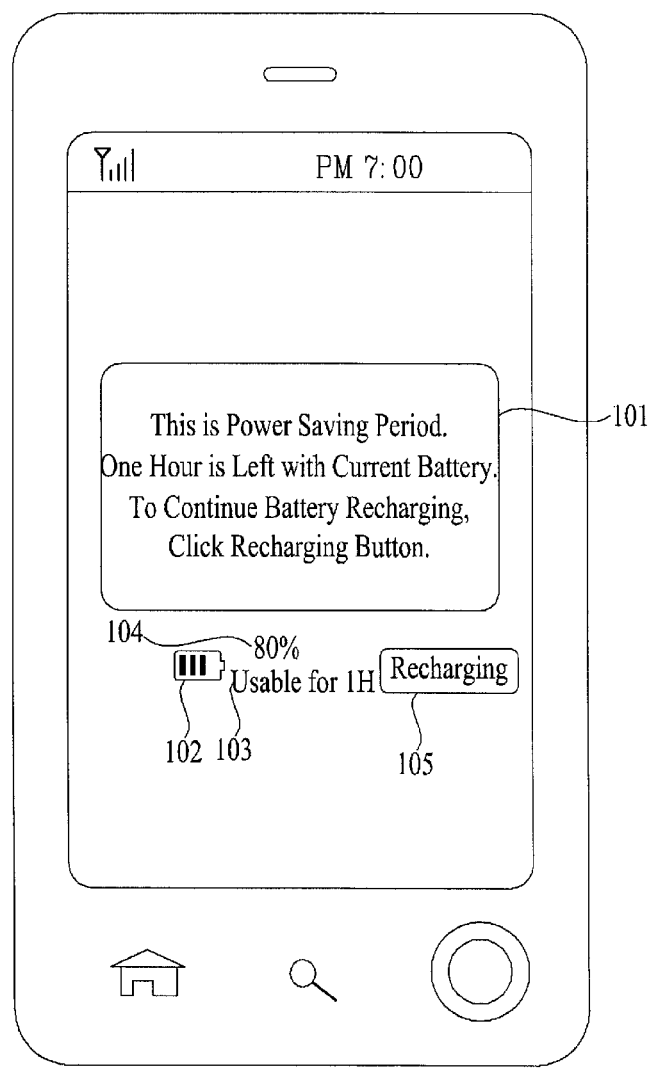

Also, if it is determined in the step S211 that there is sufficient battery leftover, the controller 49 provides the user notification message (D) shown in FIG. 15 with the user (S214). The user notification message can be provided with sound effects. According to an embodiment in FIG. 15, the user notification message (D) includes a text message 101 that inform the user of the current status, graphic messages 102, 103, and 104 that indicate the current status in graphics, and a recharging cancellation button 105. For example, the text message 101 informs the power saving period, battery leftover and an estimated time of recharging. Also, the current amount of battery leftover and the estimated time can be graphically provided by the graphic messages 102, 103, and 104. If the user executes wireless recharging by referring to the text message 101 and the graphic messages 102, 103, and 104, the recharging button 105 can be selected (or clicked). If the controller 49 detects the user's wireless recharging request (S213), a command to perform the wireless recharging is transmitted to the wireless power supplying device 30 (S209) and then wireless recharging is enabled by the received wireless power. If there is no user's wireless recharging request, the controller 49 stays the wireless recharging being aborted and transmits the wireless power abortion request command to the wireless power supplying device 30 on a regular basis, if necessary (S208).

It is obvious that the user notification messages (A, B, C, and D) shown in FIGS. 12 to 15 can be realized in various modified methods.

MODES FOR CARRYING OUT THE INVENTION

A method of controlling wireless power transmission applied to the present disclosure can be stored in recording media readable by computers can and as a program that is excusable in computers. The recording media by computers include all types of storing device that stores data readable by the computer system. Examples of the recording media readable by computers are ROM, RAM, CD-ROM, magnetic tapes, floppy disks, optical data storing devices, and carrier waves (i.e. transmission via Internet). Also, bit streams generated by the method of controlling wireless power transmission applied to the present disclosure can be stored in recording media readable by computers or wired/wireless communication networks can be used for the transmission.

INDUSTRIAL AVAILABILITY

The present disclosure can be applied to electronic devices capable of receiving wireless power or wireless chargeable electronic devices using wireless power and related wireless power supplying devices that use wireless power. Although the present disclosure is limited to the embodiments and drawings, it will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

What is claimed is:

1. An electronic device for receiving wireless power, the electronic device comprising:
    a communication unit configured to receive power information including at least one of electricity bill information and power demand information;
    a wireless power receiving unit configured to receive wireless power from a wireless power supplying device;
    a power converting unit configured to convert the received wireless power to power usable for the electronic device;
    a controller configured to determine a power saving period based on the received power information and control the electronic device such that a request for aborting wireless power transmission is sent to the wireless power supplying device through the communication unit during the power saving period and a request for wireless power transmission is sent to the wireless power supplying device through the communication unit during a non-power saving period;
    a supplemental power storage configured to store supplemental power, wherein the supplemental power of the supplemental power storage is used for operation of the electronic device and is rechargeable; and
    a supplemental power assuring unit configured to determine an amount of the supplemental power stored in the supplemental power storage.

2. The electronic device of claim 1, wherein the controller is further configured to determine that a high-priced period determined from the electricity bill information or an over-demanding period determined from the power demand information is the power saving period.

3. The electronic device of claim 2, wherein the high-priced period or the over-demanding period is settable by a user.

4. The electronic device of claim 1, further comprising a supplemental power unit configured to supply supplemental power, wherein the supplemental power of the supplemental power unit is used for minimum operations of the electronic device.

5. The electronic device of claim 4, further comprising a display unit configured to provide a display screen, wherein the controller is further configured to control the electronic device such that a user notification message is provided to one side of the display unit based on whether or not the user notification message is provided during the power saving period.

6. The electronic device of claim 1, further comprising a display unit configured to provide a display screen, wherein the controller is further configured to control the electronic device such that a user notification message is provided to one side of the display unit based on whether or not the user notification message is provided during the power saving period and indicates an amount of the supplemental power.

7. The electronic device of claim 6, wherein if a user's wireless power transmission command or a user's wireless power transmission abortion command is inputted to the electronic device after the user notification message is provided, the controller is further configured to control the electronic device such that a wireless power transmission request or a wireless power transmission abortion request is transmitted to the wireless power supplying device through the communication unit.

8. The electronic device of claim 6, wherein the controller is further configured to provide different notification messages based on whether or not respective ones of the different user notification messages are provided during the power saving period and indicate sufficient supplemental power, during the power saving period and indicate insufficient supplemental power, during a non-power saving period and indicate sufficient supplemental power, and during a non-power saving period and indicate insufficient supplemental power.

9. A wireless power transmission control method for an electronic device that receives wireless power supplied from a wireless power supplying device, the method comprising:
receiving power information including at least one of electricity bill information and power demand information;
determining a power saving period based on the received power information;
sending a request for aborting wireless power transmission to the wireless power supplying device during the power saving period;
sending a request for wireless power transmission to the wireless power supplying device during a non-power saving period;
storing supplemental power in a supplemental power storage of the electronic device, wherein the supplemental power is used for operation of the electronic device and is rechargeable; and
determining an amount of the supplemental power stored in the supplemental power storage.

10. The method of claim 9, further comprising providing a notification message on one side of a display unit based on the determination of the power saving period.

11. The method of claim 9, further comprising:
providing a notification message on one side of a display unit based on the determination of the power saving period and the amount of supplemental power that is rechargeable in the electronic device; and
executing one of a wireless power transmission request and a wireless power transmission abortion request based on the notification message.

12. A wireless power supplying system comprising:
an electronic device; and
a wireless power supplying device configured to transmit wireless power, wherein the wireless power supplying device comprises a wireless power pad for supplying wireless power to the electronic device,
wherein the electronic device is configured to receive the transmitted wireless power on the wireless power pad and further comprises:
a communication unit configured to receive power information including at least one of electricity bill information and power demand information;
a wireless power receiving unit configured to receive the wireless power from the wireless power supplying device;
a power converting unit configured to convert the received wireless power to power usable for the electronic device;
a supplemental power storage configured to store supplemental power in the electronic device, wherein the supplemental power of the supplemental power storage is used for operation of the electronic device and is rechargeable;
a supplemental power assuring unit configured to determine an amount of the supplemental power stored in the supplemental power storage; and
a controller configured to determine a power saving period based on the received power information and control the electronic device such that a request for aborting wireless power transmission is sent to the wireless power supplying device through the communication unit during the power saving period and a request for wireless power transmission is sent to the wireless power supplying device through the communication unit during a non-power saving period.

* * * * *